United States Patent [19]
Kaneshiro et al.

[11] Patent Number: 6,133,407
[45] Date of Patent: Oct. 17, 2000

[54] POLYIMIDE PRECURSOR SOLUTION, COATING FILM OBTAINED THEREFROM, AND PROCESS FOR PRODUCING POLYIMIDE COATING FILM

[75] Inventors: Hisayasu Kaneshiro; Jushiro Eguchi; Yoshiaki Echigo; Takahiro Ono, all of Uji, Japan

[73] Assignee: Unitka Ltd., Hyogo, Japan

[21] Appl. No.: 09/102,672

[22] Filed: Jun. 23, 1998

[30] Foreign Application Priority Data

| Jun. 23, 1997 | [JP] | Japan | 9-165557 |
| Jul. 2, 1997 | [JP] | Japan | 9-176759 |
| Jul. 2, 1997 | [JP] | Japan | 9-176760 |
| Jul. 2, 1997 | [JP] | Japan | 9-176761 |
| Jul. 10, 1997 | [JP] | Japan | 9-184767 |
| Jul. 16, 1997 | [JP] | Japan | 9-191037 |
| Jul. 16, 1997 | [JP] | Japan | 9-191038 |
| Jul. 18, 1997 | [JP] | Japan | 9-193584 |
| Sep. 12, 1997 | [JP] | Japan | 9-248103 |
| Nov. 7, 1997 | [JP] | Japan | 9-305250 |
| Mar. 24, 1998 | [JP] | Japan | 10-075277 |
| Mar. 25, 1998 | [JP] | Japan | 10-076960 |

[51] Int. Cl.[7] .......................... C08G 73/10; C08G 69/26
[52] U.S. Cl. .......................... 528/353; 528/125; 528/126; 528/128; 528/170; 528/171; 528/172; 528/173; 528/176; 528/183; 528/185; 528/188; 528/220; 528/229; 528/332; 528/350; 528/174; 428/473.5
[58] Field of Search .......................... 528/353, 170, 528/171, 172, 173, 125, 128, 126, 176, 183, 185, 188, 332, 220, 229, 350, 174; 428/473.5

[56] References Cited

U.S. PATENT DOCUMENTS

| 5,025,084 | 6/1991 | Dobinson et al. | 528/351 |
| 5,032,667 | 7/1991 | Harris et al. | 528/351 |
| 5,112,942 | 5/1992 | Blocker | 528/353 |
| 5,686,559 | 11/1997 | Rhee et al. | 528/353 |
| 5,844,065 | 12/1998 | Liaw et al. | 528/353 |
| 5,854,380 | 12/1998 | Seto et al. | 528/353 |
| 5,866,676 | 2/1999 | Jensen | 528/353 |

*Primary Examiner*—P. Hampton Hightower
*Attorney, Agent, or Firm*—Sughrue, Mion, Zinn, Macpeak & Seas, PLLC

[57] ABSTRACT

A polyimide precursor solution having a high concentration yet low viscosity, a polyimide coating film having satisfactory physical properties which is prepared from the polyimide precursor solution, and a process for producing a polyimide coating film using the polyimide precursor solution. The polyimide precursor solution has dissolved therein a specific salt of a diamine and a tetracarboxylic acid and/or a dicarboxylic acid-dialkyl ester in a high concentration, the diamine and the tetracarboxylic acid and/or the dicarboxylic acid-dialkyl ester being capable of forming a polyimide. Also disclosed is a polyimide coating film obtained by heating the solution to cause imidization and a process for producing the polyimide coating film.

15 Claims, No Drawings

POLYIMIDE PRECURSOR SOLUTION, COATING FILM OBTAINED THEREFROM, AND PROCESS FOR PRODUCING POLYIMIDE COATING FILM

FIELD OF THE INVENTION

The present invention relates to a polyimide precursor solution, a polyimide coating obtained therefrom and a process for producing the same.

BACKGROUND OF THE INVENTION

Polyimide is one of engineering plastics which, in recent years, has drawn attention especially in the electric and electronic, automobile, space, aircraft and the like industries due to its excellent heat resistance and mechanical characteristics. Thus, polyimide is expected to be in high demand. Since most polyimides are sparingly soluble or insoluble in organic solvents, a solution of a polyimide precursor which is soluble in an organic solvent has been used in various fields. As a polyimide precursor solution, a solution containing a poly(amic acid) represented by the following general formula is known.

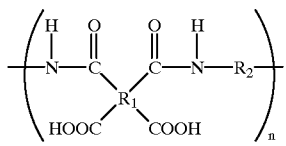

wherein $R_1$ and $R_2$: aromatic residues

This poly(amic acid) solution is produced by reacting an aromatic diamine with an aromatic tetracarboxylic dianhydride in a solvent. Various solutions have been proposed. For example, the use of an aprotic polar solvent is described in JP-B-36-10999, JP-A-62-275165, JP-A-64-5057, JP-B-2-38149 and JP-B-2-38150, JP-A-1-299871, JP-A-58-12292, JP-B-1-34454, JP-A-58-185624, Journal of Polymer Science, Macromolecular Reviews, vol. 11, p. 199 (1976), U.S. Pat. No. 4,238,528, JP-B-3-4588, JP-B-7-3024, JP-A-7-41556, JP-A-7-62095, JP-A-7-133349, JP-A-7-149896, JP-A-6-207014, JP-B-7-17870, JP-B-7-17871, and IBM Technical Disclosure Bulletin vol. 20, No. 6, p. 2041 (1977) (the term "JP-A" as used herein means an "unexamined published Japanese patent application" and the term "JP-B" as used herein means an "examined Japanese patent publication"). Furthermore, the use of a mixed solvent selected from a water-soluble ether compound, a water-soluble alcohol compound, a water-soluble ketone compound and water is disclosed in JP-A-6-1915.

As a polyimide precursor which is a solute in the polyimide precursor solution, a variety of polymers other than the poly(amic acid) are known. For example, a poly(amic acid) ester represented by the following general formula

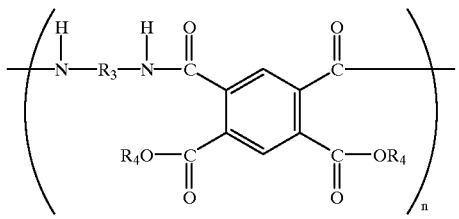

wherein $R_3$: an aromatic residue $R_4$: an aliphatic residue is disclosed in Macromolecules vol. 22, p. 4477 (1989) and Polyimides and Other High Temperature Polymers, p. 45 (1991). Macromolecules, vol. 24, p. 3475 (1991) discloses a poly(amic acid) trimethylsilyl ester represented by the following general formula.

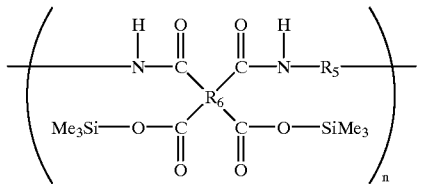

wherein $R_5$ and $R_6$: an aromatic residue

Me: a methyl group

Journal of Polymer Science Part B, vol. 8, p. 29 (1970), Journal of Polymer Science Part B, vol. 8, p. 559 (1970), Journal of Chemical Society of Japan, vol. 1972, p. 1992, Journal of Polymer Science Polymer Chemistry Edition, vol. 13, p. 365 (1975) disclose a poly(amic acid) bis (diethylamide) represented by the following formula.

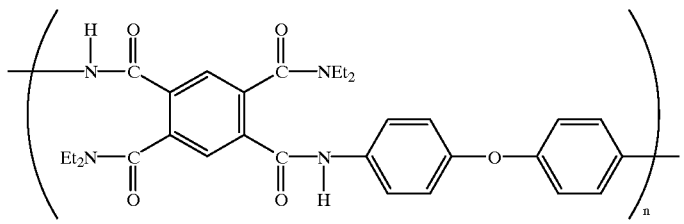

wherein

Et: an ethyl group.

The above-mentioned precursors are all polymers having a high degree of polymerization.

When polyimide coatings are obtained from solutions containing these polymers as a solute, generally, the polymer solutions are coated on a substrate such as copper, glass or the like, the solvent is removed, and imidization is conducted to form polyimide coatings.

However, when a polymer solution having such a high degree of polymerization is coated on a substrate, there is a problem in that the solid content must be reduced to provide a coating solution having a suitable viscosity. Furthermore, when the solid content is increased to raise productivity, the viscosity of the solution is increased, which makes coating very difficult. Still further, even if coating is possible, a coating or a film having excellent mechanical and thermal characteristics cannot be obtained. Furthermore, a polymer solution can hardly withstand long-term storage, and it is quite difficult to store a polymer for a long period of time while maintaining the polymerization degree of the polymer.

SUMMARY OF THE INVENTION

Accordingly, an object of the present invention is to provide a polyimide precursor solution which contains a polyimide precursor in a high concentration and yet has a low viscosity; a polyimide coating film with satisfactory physical properties which can be obtained from the polyimide precursor solution; and a process for producing the polyimide coating film.

The present inventors have conducted extensive investigations in order to solve the above-described problems of the prior art and have found, as a result, that a polyimide coating film having satisfactory physical properties can be obtained from a solution containing no polymer but rather a specific combination of monomers. That is, the present inventors have found that a polyimide precursor solution containing a salt of monomers formed from a diamine represented by formula (I) shown below and a tetracarboxylic acid and/or an aromatic dicarboxylic acid-dialkyl ester represented by formula (II) shown below exhibits a low viscosity despite the high concentration of the monomer salt, and furthermore, that the precursor solution provides a high strength polyimide coating film. The present invention has been achieved based on these findings. Considering that every previously known polyimide precursor as a solute has a high degree of polymerization, these findings are very surprising.

The present invention relates to a polyimide precursor solution capable of forming a polyimide on imidization, comprising a solvent and a solute dissolved in the solvent, said solute comprising, in a concentration of not less than 30% by weight of the solution, a salt comprising an aromatic diamine (preferably, an aromatic diamine represented by formula (I):

$$H_2N\text{—}R\text{—}NH_2 \qquad (I)$$

wherein R represents a divalent aromatic residual group containing at least one 6-membered carbon ring and not containing a heterocyclic ring), and an aromatic tetracarboxylic acid and/or an aromatic dicarboxylic acid-dialkyl ester (preferably, an aromatic tetracarboxylic acid and/or an aromatic dicarboxylic acid-dialkyl ester represented by formula (II):

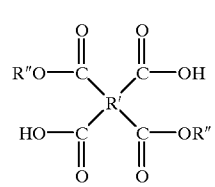

wherein R' represents a tetravalent aromatic residual group containing at least one 6-membered carbon ring and not containing a heterocyclic ring; the four carboxyl groups are bonded to different carbon atoms on the residual group R', making two pairs each one of which is bonded to adjacent carbon atoms on the residual group R'; and R" represents a hydrogen atom or a substituted or unsubstituted alkyl group having 1 to 5 carbon atoms).

The present invention also relates to a polyimide coating film obtained from the above-described polyimide precursor solution.

The present invention further relates to a process for producing a polyimide coating film which comprises applying the above-described polyimide precursor solution to a substrate and heating the coating film to cause imidization.

DETAILED DESCRIPTION OF THE INVENTION

Before describing the details of the invention, some technical terms as used herein are defined as follows.

The term "salt" as used herein means a complex obtained by mixing an amino-containing compound with an equivalent amount of a carboxyl-containing compound in a solvent, in which the amino group and the carboxyl group can be linked to each other in any of several modes (e.g., by ionic bonding or nonionic bonding).

(1) The term "polyimide" denotes an organic polymer comprising not less than 80 mol % of a repeating unit having an imide structure. The polyimide shows a glass transition temperature of 320° C. or lower as measured with a differential scanning calorimeter, DSC-7 manufactured by Perkin Elmer Co.

(2) The term "polyimide precursor" denotes an organic compound that cyclizes under heating or by chemical action into a polyimide.

(3) The term "polyimide precursor solution" means a solution of a polyimide precursor in a solvent. The solvent should be a liquid at 25° C.

(4) The term "viscosity" means a rotational viscosity measured at 20° C. with a Brookfield viscometer, digital DVL-BII Model manufactured by Tokimec Inc.

(5) The term "solid concentration" means a weight percentage of a solute, namely, a polyimide precursor, in a polyimide precursor solution.

(6) The term "polyimide coating film" means a film of polyimide formed on a substrate, such as copper, aluminum or glass. A polyimide coating film that is used to coat a substrate is called "a polyimide coat", whereas a coating film which is stripped off a substrate is called "a polyimide film".

(7) The aromatic diamine is preferably those represented by formula (I).

(8) The aromatic tetracarboxylic acid and/or an aromatic dicarboxylic acid-dialkyl ester is preferably those represented by formula (II).

(9) The polyimide precursor solution according to the present invention comprises a salt formed of a diamine of formula (I) and a tetracarboxylic acid and/or an aromatic dicarboxylic acid-dialkyl ester represented by formula (II) dissolved in a solvent.

In formula (I), R represents a divalent aromatic residual group containing at least one 6-membered carbon ring and not containing a heterocyclic ring. Specific examples of R include the following groups. The residual group R in the diamine component may be one of these groups or a mixture of two or more thereof.

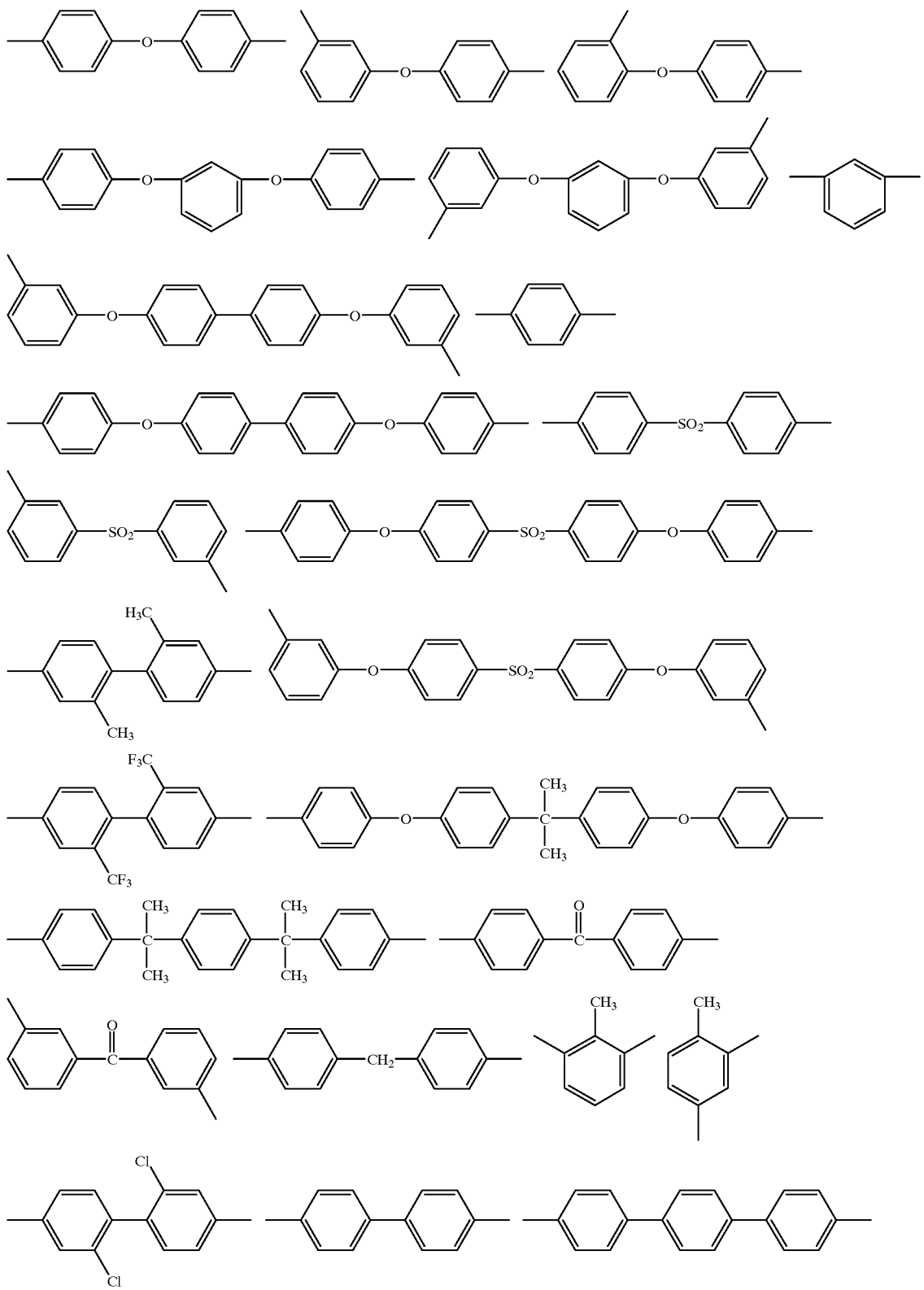

R preferably represents the following group or groups.

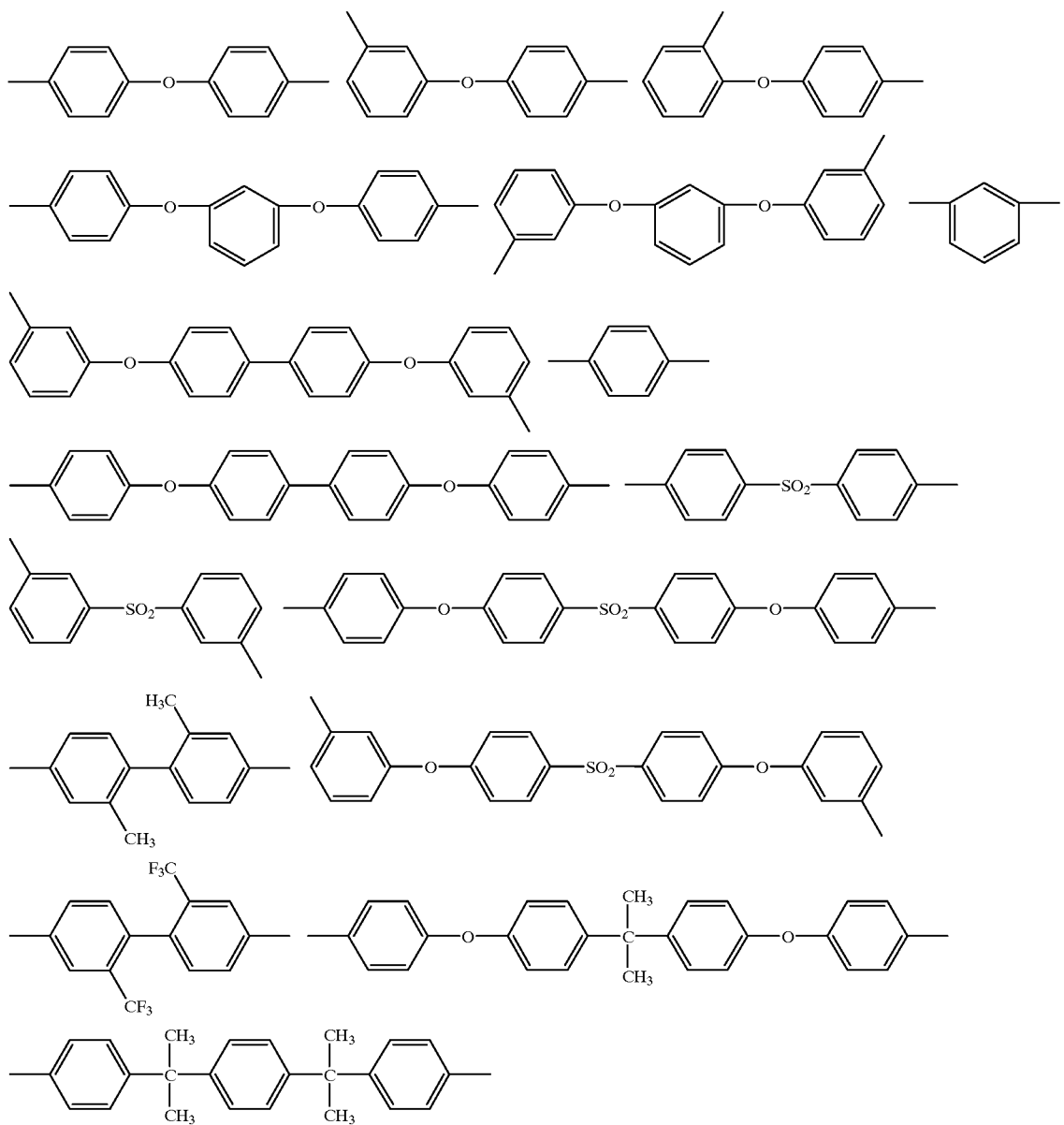

In formula (II), R' represents a tetravalent aromatic residual group containing at least one 6-membered carbon ring and not containing a heterocyclic ring. The four carboxyl groups are bonded to different carbon atoms on the residual group R', making two pairs each one of which is bonded to adjacent carbon atoms on the residual group R'. Specific examples of R' include the following groups. The residual group R' in formula (II) may be one of these groups or a mixture of two or more thereof.

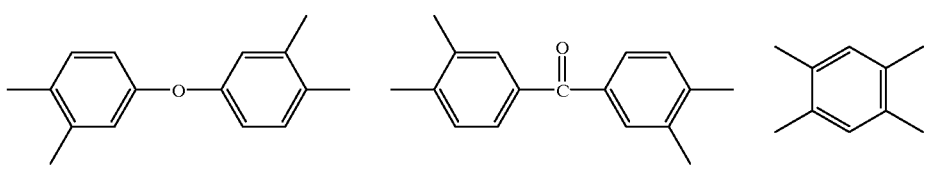

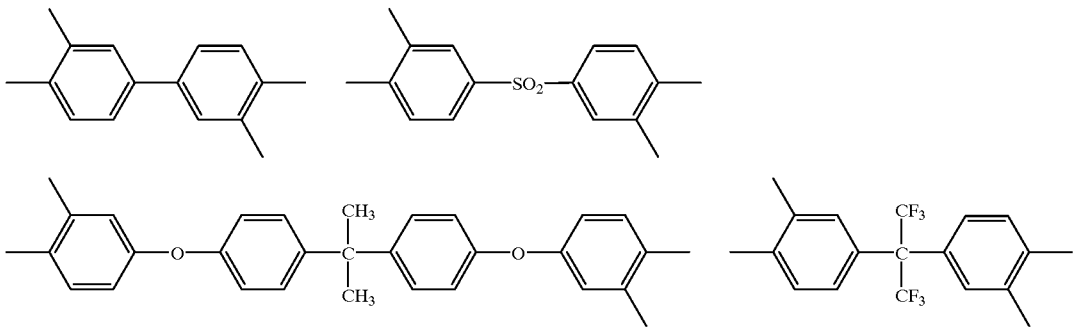

R' preferably represents the following group or groups.

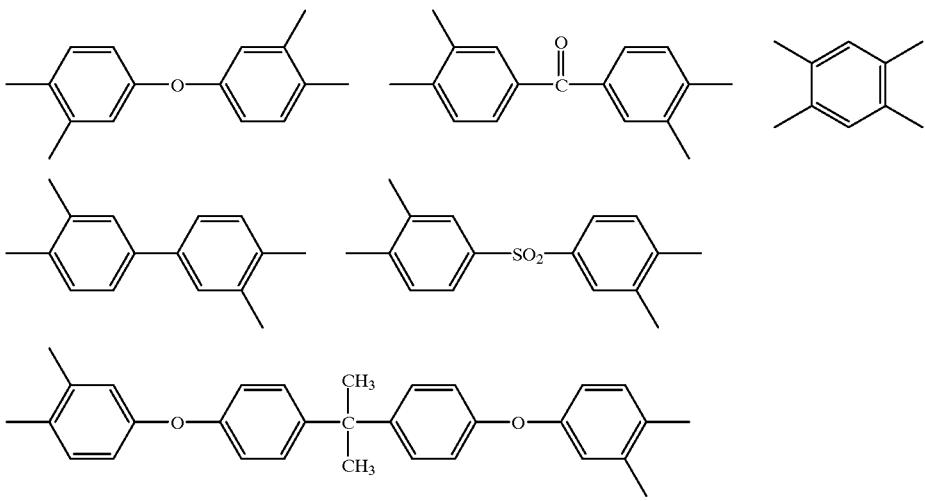

In formula (II), R" includes H, $CH_3$, $C_2H_5$, $C_3H_7$, $C_4H_9$, and $C_5H_{11}$. R" preferably represents H, $CH_3$ or $C_2H_5$.

The solvent for use in preparing the polyimide precursor solution is not particularly limited so long as it is capable of dissolving the "salt" to provide a uniform solution. In particular, aprotic polar solvents, compounds having an ether group and an alcohol hydroxyl group per molecule, ether compounds, alcohol compounds, ketone compounds, ester compounds and amine compounds are preferred solvents. These solvents can be used either individually or as a mixture of two or more thereof.

Examples of the aprotic polar solvents are N-methyl-2-pyrrolidone, N,N-dimethylformamide, N,N-dimethylacetamide, and dimethyl sulfoxide, with N,N-dimethylformamide being preferred.

Examples of the compounds having an ether group and an alcoholic hydroxyl group per molecule include 2-methoxyethanol, 2-ethoxyethanol, 2-(methoxymethoxy)ethoxyethanol, 2-isopropoxyethanol, 2-butoxyethanol, tetrahydrofurfuryl alcohol, diethylene glycol, diethylene glycol monomethyl ether, diethylene glycol monoethyl ether, diethylene glycol monobutyl ether, triethylene glycol, triethylene glycol monoethyl ether, tetraethylene glycol, 1-methoxy-2-propanol, 1-ethoxy-2-propanol, dipropylene glycol, dipropylene glycol monomethyl ether, dipropylene glycol monoethyl ether, tripropylene glycol monomethyl ether, polyethylene glycol and polypropylene glycol.

Examples of the ether compounds are tetrahydrofuran, dioxane, 1,2-dimethoxyethane, diethylene glycol dimethyl ether and diethylene glycol diethyl ether.

Examples of the alcohol compounds include methanol, ethanol 1-propanol, 2-propanol, t-butyl alcohol, ethylene glycol, 1,2-propanediol, 1,3-propanediol, 1,3-butanediol, 1,4-butanediol, 2,3-butanediol, 1,5-pentanediol, 2-butene-1,4-diol, 2-methyl-2,4-pentanediol, 1,2,6-hexanetriol and benzyl alcohol.

Examples of the ketone compounds include acetone, methyl ethyl ketone, cyclohexanone and isophorone.

Examples of the ester compounds include ethyl acetate and y-butyrolactone.

While any amine compound is useful as a solvent, tertiary amine compounds are preferred. Triethylamine and dimethylaminoethanol are more preferred.

The concentration of the polyimide precursor in the polyimide precursor solution is not lower than 30% by weight, preferably 40% by weight or higher, still preferably 50% by weight or higher. If the concentration is lower than 30% by weight, the viscosity of the solution is too low to provide a coating film of the desired thickness or a uniform coating film.

The polyimide precursor solution preferably has a viscosity of not more than 100 poise, particularly 50 poise or less, especially 20 poise or less. If the viscosity exceeds 100 poise, productivity tends to decrease when the solution is used for impregnation. A polyimide precursor solution in which the concentration of the polyimide precursor is 50% by weight or more and the viscosity of the polyimide precursor solution is 20 poise or less is particularly preferable.

The polyimide precursor solution of the invention can be prepared by successively dissolving a diamine of formula (I) and a tetracarboxylic acid and/or a dicarboxylic acid-dialkyl ester of formula (II) in a solvent. The order of dissolving the two compounds (I) and (II) is arbitrary.

Part of the tetracarboxylic acid or the dicarboxylic acid-dialkyl ester of formula (II) can be displaced with a carboxylic acid represented by formula (III):

(III)

and/or a dicarboxylic acid anhydride represented by formula (IV):

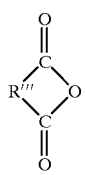

(IV)

wherein R" is as defined above; and R'" represents a divalent aromatic residual group containing at least one 6-membered carbon ring; and the two carbonyl groups in formula (IV) are bonded to different carbon atoms on the residual group R'".

It is possible to control the melt flowability of the resulting polyimide by adjusting the proportion of the carboxylic acid component of formula (III) and/or (IV). A preferred molar ratio of the tetracarboxylic acid and/or the dicarboxylic acid-dialkyl ester of formula (II) to the carboxylic acid of formula (III) and/or the dicarboxylic acid anhydride of formula (IV) (i.e., (II):(III) and/or (IV)) is from 100:0 to 100:30, particularly 100:0 to 100:11. If the molar ratio of the carboxylic acid (III) and/or dicarboxylic acid anhydride (IV) to the tetracarboxylic acid and/or the dicarboxylic acid-dialkyl ester (II) exceeds 0.3, the resulting polyimide film is likely to be brittle. In using the carboxylic acid (III) and/or the dicarboxylic acid anhydride (IV) having introduced therein a reactive group having thermal polymerizability, such as a vinyl group or an ethynyl group, a polyimide having a crosslinked structure will be formed.

The melt flowability of the resulting polyimide can also be controlled by replacing part of the diamine (I) with an amine represented by formula (V):

R""—NH$_2$ (V)

wherein R"" represents a monovalent aromatic residual group containing at least one 6-membered carbon ring.

A preferred molar ratio of the diamine (I) to the amine (V) is 100:0 to 100:30, particularly 100:0 to 100:11. If the molar ratio of the amine (V) to the diamine (I) exceeds 0.3, the resulting polyimide tends to be brittle. In using the amine (V) having introduced therein a reactive group having thermal polymerizability, such as a vinyl group or an ethynyl group, a polyimide having a crosslinked structure will be formed.

If desired, the polyimide precursor solution can contain various additives customarily used in the art, such as organic silane compounds, electrically conductive carbon black or metal particles, abrasive agents, dielectrics, lubricants, and the like as long as the effects of the present invention are not impaired. The solution can further contain other solvents (e.g., halogenated hydrocarbons and hydrocarbons) or other polymers as long as the effects of the present invention are not ruined.

The polyimide coating film is obtained by applying the polyimide precursor solution of the present invention on a substrate, drying the coating film to remove the solvent, and heating the dried coating film for imidization. Imidization is carried out by heating at a temperature of 150° C. or higher, preferably 200° C. or higher, still preferably 250° C. or higher, for a period of at least 10 minutes, preferably 30 minutes or longer.

Suitable substrates on which the solution can be applied include copper, aluminum and glass.

A polyimide film, which is a film stripped off the substrate, is produced, for example, by extrusion coating from a slit nozzle or by means of a film applicator or a bar coater. A polyimide coat, which is used in contact with a substrate, is produced, for example, by spin coating, spray coating, dip coating, and the like.

The polyimide resin precursor solution and the coating film (film and coating) obtained therefrom are useful in the production of heat-resistant insulating tape, heat-resistant adhesive tape, high-density magnetic recording medium bases, capacitors, composite materials, and films for FPC (flexible printed circuits). They are also useful as a molding material for the production of fluororesin- or graphite-loaded sliding parts, glass fiber- or carbon fiber-reinforced structural parts, bobbins for small coils, sleeves, tubes for terminal insulation, etc.; a laminating material for the production of insulating spacers for power transistors, magnetic head spacers, power relay spacers, transformer spacers, etc.; an enamel coating material in electric wire and cable insulation and production of solar cells, low-temperature storage tanks, aerospace insulating materials, integrated circuits, slot liners, etc. They are also used in the production of ultrafiltration membranes, reverse osmosis membranes, gas separation membranes, and heat-resistant yarn, woven fabric and nonwoven fabric.

The present invention will now be illustrated in greater detail with reference to following Examples, but it should be understood that the present invention is not to be construed as being limited thereto. In the Examples, tensile strength was measured according to JIS K 7127.

EXAMPLE 1

In 10.00 g of N-methyl-2-pyrrolidone was dissolved 3.49 g of 3,4'-oxydianiline, and 6.08 g (1 equiv.) of dimethyl 4,4'-oxydiphthalate was added thereto, followed by stirring for 1 hour, to obtain a uniform clear pale brown solution. The solid concentration and viscosity of the resulting solution are shown in Table 1 below.

The resulting solution was cast on a glass substrate to a thickness of 50 μm by means of a film applicator, dried in a nitrogen gas atmosphere at 80° C. for 5 hours, and heated in a nitrogen gas atmosphere at 300° C. for 5 hours to cause imidization. The coating film was peeled off the glass substrate to obtain a polyimide film. The thickness and tensile strength of the polyimide film and the glass transition temperature of the polyimide constituting the film are shown in Table 1.

EXAMPLE 2

In 15.00 g of N,N-dimethylformamide was dissolved 5.50 g of 3,4'-oxydianiline, and 9.50 g (1 equiv.) of 4,4'- oxydiphthalic acid was added thereto, followed by stirring for 1 hour, to obtain a uniform clear pale brown solution. The solid concentration and viscosity of the resulting solution are shown in Table 1 below.

The resulting solution was cast on a glass substrate to a thickness of 50 μm by means of a film applicator, dried in a nitrogen gas atmosphere at 80° C. for 5 hours, and heated in a nitrogen gas atmosphere at 300° C. for 5 hours to cause imidization. The coating film was peeled off the glass substrate to obtain a polyimide film. The thickness and tensile strength of the polyimide film and the glass transition temperature of the polyimide constituting the film are shown in Table 1.

EXAMPLE 3

In 15.00 g of diethylene glycol monomethyl ether was dissolved 5.50 g of 3,4'-oxydianiline, and 9.50 g (1 equiv.) of 4,4'-oxydiphthalic acid was added thereto, followed by stirring for 1 hour, to obtain a uniform clear pale brown solution. The solid concentration and viscosity of the resulting solution are shown in Table 1 below.

The resulting solution was cast on a glass substrate to a thickness of 50 μm by means of a film applicator, dried in a nitrogen gas atmosphere at 80° C. for 5 hours, and heated in a nitrogen gas atmosphere at 300° C. for 5 hours to cause imidization. The coating film was peeled off the glass substrate to obtain a polyimide film. The thickness and tensile strength of the polyimide film and the glass transition temperature of the polyimide constituting the film are shown in Table 1.

EXAMPLE 4

In 22.50 g of dimethylaminoethanol was dissolved 5.50 g of 3,4'-oxydianiline, and 9.50 g (1 equiv.) of 4,4'-oxydiphthalic acid was added thereto, followed by stirring for 1 hour to obtain a uniform clear pale brown solution. The solid concentration and viscosity of the solution are shown in Table 1.

The solution was applied to a glass substrate with a spin coater, dried at 50° C. for 1 hour and at 100° C. for 5 hours, and heated in a nitrogen gas atmosphere at 300° C. for 5 hours to obtain a polyimide-coated glass substrate. The glass transition temperature of the polyimide coat is shown in Table 1.

EXAMPLE 5

In 42.9 g of a mixed solvent of tetrahydrofuran and methanol (8:2 by weight) was dissolved 34.9 g of 3,4'-oxydianiline, and 60.8 g (1 equiv.) of dimethyl 4,4'-oxydiphthalate was added thereto, followed by stirring for 3 hours to obtain a uniform clear reddish brown solution. The solid concentration and viscosity of the solution are shown in Table 1.

The solution was applied to a glass substrate with a spin coater, dried spontaneously at room temperature for 2 hours, heated from 50° C. to 100° C. over a period of 48 hours, and heated at 300° C. in a nitrogen gas atmosphere for 5 hours to cause imidization. A polyimide-coated glass substrate was thus obtained. The glass transition temperature of the polyimide coat is shown in Table 1.

EXAMPLE 6

In 60.63 g of N-methyl-2-pyrrolidone was dissolved 60.8 g of dimethyl 4,4'-oxydiphthalate at 80C, and 34.9 g of 3,4'-oxydianiline was added thereto, followed by stirring for 3 hours to obtain a uniform clear reddish brown solution. The solid concentration and viscosity of the solution are shown in Table 1.

The solution at 80° C. was applied to a glass substrate with a spin coater to a thickness of 10 μm, dried spontaneously at room temperature for 2 hours, heated from 50° C. to 100° C. over a period of 48 hours, and heated at 300° C. in a nitrogen gas atmosphere for 5 hours to cause imidization. A polyimide-coated glass substrate was thus obtained. The glass transition temperature of the polyimide coat is shown in Table 1.

EXAMPLE 7

In 95.2 g of a mixed solvent of dimethoxyethane and methanol (8:2 by weight) was dissolved 34.9 g of 3,4'-oxydianiline, and 60.8 g (1 equiv.) of dimethyl 4,4'-oxydiphthalate was added thereto, followed by stirring for 3 hours to obtain a uniform clear reddish brown solution. The solid concentration and viscosity of the solution are shown in Table 1.

The solution was applied to a glass substrate with a spin coater, dried spontaneously at room temperature for 2 hours, heated from 50° C. to 100° C. over a period of 48 hours, and heated at 300° C. in a nitrogen gas atmosphere for 5 hours to cause imidization. A polyimide-coated glass substrate was thus obtained. The glass transition temperature of the polyimide constituting the coat is shown in Table 1.

EXAMPLE 8

In 10.00 g of N,N-dimethylacetamide was dissolved 3.49 g of 3,4'-oxydianiline, and 6.08 g (1 equiv.) of dimethyl 4,4'-oxydiphthalate was added thereto, followed by stirring for 1 hour to obtain a uniform clear pale brown solution. The solid concentration and viscosity of the solution are shown in Table 1.

The solution was cast on a glass substrate with a film applicator to a thickness of 50 μm, dried at 80° C. for 5 hours in a nitrogen gas atmosphere, and heated at 300° C. for 5 hours in a nitrogen gas atmosphere to cause imidization. The coating film was peeled off the glass substrate to obtain a polyimide film. The thickness and tensile strength of the polyimide film and the glass transition temperature of the polyimide constituting the film are shown in Table 1.

EXAMPLE 9

In 10.00 g of N-methyl-2-pyrrolidone were dissolved 3.19 g (0.9 equiv.) of 3,4'-oxydianiline and 0.19 g (0.1 equiv.) of p-phenylenediamine, and 6.62 g (1 equiv.) of dimethyl 4,4'-oxydiphthalate was added thereto, followed by stirring for 1 hour to obtain a uniform clear pale brown solution. The solid concentration and viscosity of the solution are shown in Table 1.

The solution was cast on a glass substrate with a film applicator to a thickness of 50 μm, dried at 80° C. for 5 hours in a nitrogen gas atmosphere, and heated at 300° C. for 5 hours in a nitrogen gas atmosphere to cause imidization. The coating film was peeled off the glass substrate to obtain a polyimide film. The thickness and tensile strength of the polyimide film and the glass transition temperature of the polyimide constituting the film are shown in Table 1.

EXAMPLE 10

In 15.00 g of N,N-dimethylformamide were dissolved 5.03 g (0.9 equiv.) of 3,4'-oxydianiline and 0.30 g (0.1 equiv.) of p-phenylenediamine, and 9.67 g (1 equiv.) of 4,4'-oxydiphthalic acid was added thereto, followed by stirring for 1 hour to obtain a uniform clear pale brown solution. The solid concentration and viscosity of the solution are shown in Table 1.

The solution was cast on a glass substrate with a film applicator to a thickness of 30 μm, dried at 80° C. for 5 hours in a nitrogen gas atmosphere, and heated at 300° C. for 5 hours in a nitrogen gas atmosphere to cause imidization. The coating film was peeled off the glass substrate to obtain a polyimide film. The thickness and tensile strength of the polyimide film and the glass transition temperature of the polyimide constituting the film are shown in Table 1.

EXAMPLE 11

In 10.00 g of a mixed solvent of tetrahydrofuran and methanol (8:2 by weight) was dissolved 6.62 g (1 equiv.) of dimethyl 4,4'-oxydiphthalate, and 3.19 g (0.9 equiv.) of 3,4'-oxydianiline and 0.19 g (0.1 equiv.) of p-phenylenediamine were added thereto, followed by stirring for 1 hour to obtain a uniform clear pale brown solution. The solid concentration and viscosity of the solution are shown in Table 1.

The solution was applied to a glass substrate with a spin coater, dried spontaneously at room temperature for 2 hours, heated from 50° C. to 100° C. over a period of 48 hours, and heated at 300° C. in a nitrogen gas atmosphere for 5 hours to cause imidization. A polyimide-coated glass plate was thus obtained. The glass transition temperature of the polyimide constituting the coat is shown in Table 1.

EXAMPLE 12

In 250 g of N,N-dimethylformamide was dissolved 151.68 g of 3,3',4,4'-biphenyltetracarboxylic acid, and 78.18 g (0.85 equiv.) of 3,4'-oxydianiline and 20.14 g (0.15 equiv.) of 1,3-bis(3-aminophenoxy)benzene were added thereto, followed by stirring for 1 hour, to obtain a uniform clear pale brown solution. The solid concentration and viscosity of the resulting solution are shown in Table 1 below.

The resulting solution was cast on a glass substrate to a thickness of 15 μm by means of a film applicator, dried in a nitrogen gas atmosphere at 80° C. for 5 hours, and heated in a nitrogen gas atmosphere at 200° C. for 1 hour and then at 300° C. for 1 hour to complete imidization. The coating film was peeled off the glass substrate to obtain a polyimide film. The thickness and tensile strength of the polyimide film and the glass transition temperature of the polyimide constituting the film are shown in Table 1.

EXAMPLE 13

In 375 g of dimethylaminoethanol was dissolved 151.68 g of 3,3',4,4'-biphenyltetracarboxylic acid, and 78.18 g (0.85 equiv.) of 3,4'-oxydianiline and 20.14 g (0.15 equiv.) of 1,3-bis(3-aminophenoxy)benzene were added thereto, followed by stirring for 1 hour, to obtain a uniform clear pale brown solution. The solid concentration and viscosity of the resulting solution are shown in Table 1 below.

The resulting solution was cast on a glass substrate to a thickness of 15 μm by means of a film applicator, dried in a nitrogen gas atmosphere at 80° C. for 5 hours, and heated in a nitrogen gas atmosphere at 200° C. for 1 hour and then at 300° C. for 1 hour to complete imidization. The coating film was peeled off the glass substrate to obtain a polyimide film. The thickness and tensile strength of the polyimide film and the glass transition temperature of the polyimide constituting the film are shown in Table 1.

EXAMPLE 14

In 250 g of a mixed solvent of tetrahydrofuran and methanol (8:2 by weight) was dispersed 156.49 g of dimethyl 3,3',4,4'-biphenyltetracarboxylate, and 74.35 g (0.85 equiv.) of 3,4'-oxydianiline and 19.16 g (0.15 equiv.) of 1,3-bis(3-aminophenoxy)benzene were added thereto, followed by stirring for 1 hour to obtain a uniform clear pale brown solution. The solid concentration and viscosity of the solution are shown in Table 1.

The solution was applied to a glass plate with a spin coater, dried spontaneously at room temperature for 2 hours, heated from 50° C. to 100° C. over a period of 48 hours, and heated at 300° C. in a nitrogen gas atmosphere for 5 hours to cause imidization. A polyimide-coated glass plate was thus obtained. The glass transition temperature of the polyimide constituting the coating film is shown in Table 1.

EXAMPLE 15

In 320 g of N-methylpyrrolidone were dissolved 264.95 g (0.91 equiv.) of dimethyl 3,3',4,4'-biphenyltetracarboxylate and 41 g of monomethyl 4-phenylethynylphthalate. To the solution were added 138.35 g (0.85 equiv.) of 3,4'-oxydianiline and 35.64 g (0.15 equiv.) of 1,3-bis(3-aminophenoxy)benzene. The mixture was stirred for 3 hours to obtain a uniform clear reddish brown solution. The solid concentration and viscosity of the solution are shown in Table 1.

The resulting solution was cast on a glass substrate to a thickness of 30 μm by means of a film applicator, dried in a nitrogen gas atmosphere at 80° C. for 5 hours, and heated in a nitrogen gas atmosphere at 100° C. for 1 hour, at 225° C. for 1 hour and then at 300° C. for 1 hour to complete imidization. The resulting coating film was too brittle to peel off as a film. The coating film on the substrate was further heated at 350° C. for 1 hour to cause the ethynyl group to polymerize. The coating film was stripped off the glass substrate to obtain a polyimide film having a crosslinked structure. The thickness and tensile strength of the resulting polyimide film and the glass transition temperature of the polyimide constituting the film are shown in Table 1.

EXAMPLE 16

In 36 g of N,N-dimethylformamide was dissolved 10.41 g of dimethyl pyromellitate, and 13.59 g (1 equiv.) of 4,4'-bis(3-aminophenoxy)biphenyl was added thereto, followed by stirring for 1 hour, to obtain a uniform clear pale brown solution. The solid concentration and viscosity of the resulting solution are shown in Table 1 below.

The resulting solution was cast on a glass substrate to a thickness of 50 μm by means of a film applicator, dried in a nitrogen gas atmosphere at 80° C. for 5 hours, and heated in a nitrogen gas atmosphere at 300° C. for 5 hours to complete imidization. The coating film was peeled off the glass substrate to obtain a polyimide film. The thickness and tensile strength of the polyimide film and the glass transition temperature of the polyimide constituting the film are shown in Table 1.

EXAMPLE 17

In 6.00 g of N,N-dimethylformamide was dissolved 3.35 g of 2,2-bis[4-(3,4-carboxyphenoxy)phenyl]propane, and 0.65 g (1 equiv.) of m-phenylenediamine was added thereto, followed by stirring for 1 hour, to obtain a uniform clear deep brown solution. The solid concentration and viscosity of the resulting solution are shown in Table 1 below.

The resulting solution was cast on a glass substrate to a thickness of 50 μm by means of a film applicator, dried in a nitrogen gas atmosphere at 80° C. for 5 hours, and heated in a nitrogen gas atmosphere at 300° C. for 5 hours to complete imidization. The coating film was peeled off the glass substrate to obtain a polyimide film. The thickness and tensile strength of the polyimide film and the glass transition temperature of the polyimide constituting the film are shown in Table 1.

EXAMPLE 18

In 10 g of N-methylpyrrolidone were dissolved 6.41 g of dimethyl 3,3',4,4'-biphenyltetracarboxylate, and 3.59 g (1 equiv.) of 4,4-oxydianiline was added thereto. The mixture was stirred for 1 hour to obtain a uniform clear pale brown solution. The solid concentration and viscosity of the solution are shown in Table 1.

The resulting solution was cast on a glass substrate to a thickness of 15 μm by means of a film applicator, dried in a nitrogen gas atmosphere at 80° C. for 5 hours, and heated in a nitrogen gas atmosphere at 200° C. for 1 hour and then at 300° C. for 1 hour to complete imidization. The coating film was stripped off the glass substrate to obtain a polyimide film. The thickness and tensile strength of the resulting polyimide film and the glass transition temperature of the polyimide constituting the film are shown in Table 1.

EXAMPLE 19

In 15 g of N,N-dimethylformamide was dissolved 7.62 g of 3,3',4,4'-biphenyltetracarboxylic acid, and 7.38 g (1 equiv.) of 2,2'-bis(trifluoromethyl)-4,4'-diaminobiphenyl was added thereto, followed by stirring for 1 hour, to obtain a uniform clear pale brown solution. The solid concentration and viscosity of the resulting solution are shown in Table 1 below.

The resulting solution was cast on a glass substrate to a thickness of 15 μm by means of a film applicator, dried in a nitrogen gas atmosphere at 80° C. for 5 hours, and heated in a nitrogen gas atmosphere at 200° C. for 1 hour and then at 300° C. for 1 hour to complete imidization. The coating film was peeled off the glass substrate to obtain a polyimide film. The thickness and tensile strength of the polyimide film and the glass transition temperature of the polyimide constituting the film are shown in Table 1.

EXAMPLE 20

In 35 g of diethylene glycol monomethyl ether was dissolved 7.62 of 3,3',4,4'-biphenyltetracarboxylic acid, and 7.38 g (1 equiv.) of 2,2'-bis(trifluoromethyl)-4,4'-diaminobiphenyl was added thereto, followed by stirring for 1 hour, to obtain a uniform clear pale brown solution. The solid concentration and viscosity of the resulting solution are shown in Table 1 below.

The resulting solution was cast on a glass substrate to a thickness of 15 μm by means of a film applicator, dried in a nitrogen gas atmosphere at 80° C. for 5 hours, and heated in a nitrogen gas atmosphere at 200° C. for 1 hour and then at 300° C. for 1 hour to complete imidization. The coating film was peeled off the glass substrate to obtain a polyimide film. The thickness and tensile strength of the polyimide film and the glass transition temperature of the polyimide constituting the film are shown in Table 1.

EXAMPLE 21

In 250 g of N-methyl-2-pyrrolidone was dissolved 168.53 g (1 equiv.) of dimethyl 3,3',4,4'-benzophenonetetracarboxylate, and 81.47 g (1 equiv.) of 4,4'-oxydianiline was added thereto, followed by stirring for 5 hours to obtain a uniform clear pale brown solution. The solid concentration and viscosity of the solution are shown in Table 1.

The solution was cast on a glass substrate with a film applicator to a thickness of 15 μm, dried at 80° C. for 5 hours in a nitrogen gas atmosphere, and heated at 300° C. for 5 hours in a nitrogen gas atmosphere to cause imidization. The coating film was peeled off the glass substrate to obtain a polyimide film. The thickness and tensile strength of the polyimide film and the glass transition temperature of the polyimide constituting the film are shown in Table 1.

EXAMPLE 22

In 250 g of a mixed solvent of tetrahydrofuran and methanol (8:2 by weight) was dissolved 168.53 g (1 equiv.) of dimethyl 3,3',4,4,-benzophenonetetracarboxylate, and 81.47 g (1 equiv.) of 4,4'-oxydianiline was added thereto, followed by stirring for 5 hours to obtain a uniform clear pale brown solution. The solid concentration and viscosity of the solution are shown in Table 1.

The solution was cast on a glass plate with a spin coater, dried spontaneously at room temperature for 2 hours, heated from 50° C. to 100° C. over a period of 48 hours, and heated at 300° C. in a nitrogen gas atmosphere for 5 hours to cause imidization. A polyimide-coated glass substrate was thus obtained. The glass transition temperature of the polyimide constituting the coating film is shown in Table 1.

EXAMPLE 23

In 167 g of a mixed solvent of dimethoxyethane and ethanol (8:2 by weight) was dissolved 168.53 g (1 equiv.) of diethyl 3,3',4,4'-benzophenonetetracarboxylate, and 81.47 g (1 equiv.) of 4,4'-oxydianiline was added thereto, followed by stirring for 5 hours to obtain a uniform clear pale brown solution. The solid concentration and viscosity of the solution are shown in Table 1.

The solution was cast on a glass plate with a spin coater, dried spontaneously at room temperature for 2 hours, heated from 50° C. to 100° C. over a period of 48 hours, and heated at 300° C. in a nitrogen gas atmosphere for 5 hours to cause imidization. A polyimide-coated glass plate was thus obtained. The glass transition temperature of the polyimide constituting the coating film is shown in Table 1.

EXAMPLE 24

In 167 g of a mixed solvent of dimethoxyethane and methanol (8:2 by weight) was dissolved 36.53 g (1 equiv.) of dimethyl 3,3',4,4'-benzophenonetetracarboxylate, and 23.48 g (1 equiv.) of 4,4'-diaminodiphenylsulfone was added thereto, followed by stirring for 5 hours to obtain a uniform clear pale brown solution. The solid concentration and viscosity of the solution are shown in Table 1.

The solution was cast on a glass plate with a spin coater, dried spontaneously at room temperature for 2 hours, heated from 50° C. to 100° C. over a period of 48 hours, and heated at 300° C. in a nitrogen gas atmosphere for 5 hours to cause imidization. A polyimide-coated glass plate was thus obtained. The glass transition temperature of the polyimide constituting the coating film is shown in Table 1.

EXAMPLE 25

In 10.00 g of N,N-dimethylformamide was dissolved 5.42 g of 4,4'-oxydiphthalic acid, and 4.58 g (1 equiv.) of 1,3- bis(4-aminophenoxy)benzene was added thereto, followed by stirring for 1 hour, to obtain a uniform clear pale brown solution. The solid concentration and viscosity of the resulting solution are shown in Table 1 below.

The resulting solution was cast on a glass substrate to a thickness of 25 μm by means of a film applicator, dried -in a nitrogen gas atmosphere at 80° C. for 5 hours, and heated in a nitrogen gas atmosphere at 300° C. for 5 hours to complete imidization. The coating film was peeled off the glass substrate to obtain a polyimide film. The thickness and tensile strength of the polyimide film and the glass transition temperature of the polyimide constituting the film are shown in Table 1.

EXAMPLE 26

In 10.00 g of N,N-dimethylformamide was dissolved 9.64 g of 3,3',4,4'-benzophenonetetracarboxylic acid, and 7.86 g (1 equiv.) of 1,3-bis(4-aminophenoxy)benzene was added thereto, followed by stirring for 1 hour, to obtain a uniform clear pale brown solution. The solid concentration and viscosity of the resulting solution are shown in Table 1 below.

The resulting solution was cast on a glass substrate to a thickness of 25 μm by means of a film applicator, dried in a nitrogen gas atmosphere at 80° C. for 5 hours, and heated in a nitrogen gas atmosphere at 300° C. for 5 hours to complete imidization. The coating film was peeled off the glass substrate to obtain a polyimide film. The thickness and tensile strength of the polyimide film and the glass transition temperature of the polyimide constituting the film are shown in Table 1.

EXAMPLE 27

In 21.00 g of N,N-dimethylformamide was dissolved 5.17 g of 3,3',4,4'-diphenylsulfonetetracarboxylic acid, and 3.83 g (1 equiv.) of 1,3-bis(4-aminophenoxy)benzene was added thereto, followed by stirring for 1 hour, to obtain a uniform clear brown solution. The solid concentration and viscosity of the resulting solution are shown in Table 1 below.

The resulting solution was cast on a glass substrate to a thickness of 50 μm by means of a film applicator, dried in a nitrogen gas atmosphere at 80° C. for 5 hours, and heated in a nitrogen gas atmosphere at 300° C. for 5 hours to complete imidization. The coating film was peeled off the glass substrate to obtain a polyimide film. The thickness and tensile strength of the polyimide film and the glass transition temperature of the polyimide constituting the film are shown in Table 1.

EXAMPLE 28

In 10.00 g of N,N-dimethylformamide was dissolved 6.34 g of 4,4'-oxydiphthalic acid, and 3.66 g (1 equiv.) of 2,4-oxydianiline was added thereto, followed by stirring for 1 hour, to obtain a uniform clear pale brown solution. The solid concentration and viscosity of the resulting solution are shown in Table 1 below.

The resulting solution was cast on a glass substrate to a thickness of 25 Mm by means of a film applicator, dried in a nitrogen gas atmosphere at 80° C. for 5 hours, and heated in a nitrogen gas atmosphere at 300° C. for 5 hours to complete imidization. The coating film was peeled off the glass substrate to obtain a polyimide film. The thickness and tensile strength of the polyimide film and the glass transition temperature of the polyimide constituting the film are shown in Table 1.

EXAMPLE 29

In 10.00 g of N,N-dimethylformamide was dissolved 6.23 g of 3,3',4,4'-biphenyltetracarboxylic acid, and 3.77 g (1 equiv.) of 2,4'-oxydianiline was added thereto, followed by stirring for 1 hour, to obtain a uniform clear pale brown solution. The solid concentration and viscosity of the resulting solution are shown in Table 1 below.

The resulting solution was cast on a glass substrate to a thickness of 25 μm by means of a film applicator, dried in a nitrogen gas atmosphere at 80° C. for 5 hours, and heated in a nitrogen gas atmosphere at 300° C. for 5 hours to complete imidization. The coating film was peeled off the glass substrate to obtain a polyimide film. The thickness and tensile strength of the polyimide film and the glass transition temperature of the polyimide constituting the film are shown in Table 1.

EXAMPLE 30

In 10.00 g of N,N-dimethylformamide was dissolved 6.41 g of 3,3',4,4'-benzophenonetetracarboxylic acid, and 3.59 g (1 equiv.) of 2,4'-oxydianiline was added thereto, followed by stirring for 1 hour, to obtain a uniform clear pale brown solution. The solid concentration and viscosity of the resulting solution are shown in Table 1 below.

The resulting solution was cast on a glass substrate to a thickness of 25 μm by means of a film applicator, dried in a nitrogen gas atmosphere at 80° C. for 5 hours, and heated in a nitrogen gas atmosphere at 300° C. for 5 hours to complete imidization. The coating film was peeled off the glass substrate to obtain a polyimide film. The thickness and tensile strength of the polyimide film and the glass transition temperature of the polyimide constituting the film are shown in Table 1.

EXAMPLE 31

In 10.00 g of N,N-dimethylformamide was dissolved 4.45 g of 4,4'-oxydiphthalic acid, and 5.55 g (1 equiv.) of bis[4-(3-aminophenoxy)phenyl]sulfone was added thereto, followed by stirring for 1 hour, to obtain a uniform clear pale brown solution. The solid concentration and viscosity of the resulting solution are shown in Table 1 below.

The resulting solution was cast on a glass substrate to a thickness of 25 μm by means of a film applicator, dried in a nitrogen gas atmosphere at 80° C. for 5 hours, and heated in a nitrogen gas atmosphere at 300° C. for 5 hours to complete imidization. The coating film was peeled off the glass substrate to obtain a polyimide film. The thickness and tensile strength of the polyimide film and the glass transition temperature of the polyimide constituting the film are shown in Table 1.

EXAMPLE 32

In 10.00 g of N,N-dimethylformamide was dissolved 4.33 g of 3,3',4,4'-biphenyltetracarboxylic acid, and 5.55 g (1 equiv.) of bis[4-(3-aminophenoxy)phenyl]sulfone was added thereto, followed by stirring for 1 hour, to obtain a uniform clear pale brown solution. The solid concentration and viscosity of the resulting solution are shown in Table 1 below.

The resulting solution was cast on a glass substrate to a thickness of 25 μm by means of a film applicator, dried in a nitrogen gas atmosphere at 80° C. for 5 hours, and heated in a nitrogen gas atmosphere at 300° C. for 5 hours to complete imidization. The coating film was peeled off the glass substrate to obtain a polyimide film. The thickness and tensile strength of the polyimide film and the glass transition temperature of the polyimide constituting the film are shown in Table 1.

EXAMPLE 33

In 10.00 g of N,N-dimethylformamide was dissolved 4.53 g of 3,3',4,4'-benzophenonetetracarboxylic acid, and 5.47 g (1 equiv.) of bis[4-(3-aminophenoxy)phenyl]sulfone was added thereto, followed by stirring for I hour, to obtain a uniform clear pale brown solution. The solid concentration and viscosity of the resulting solution are shown in Table 1 below.

The resulting solution was cast on a glass substrate to a thickness of 25 μm by means of a film applicator, dried in a nitrogen gas atmosphere at 80° C. for 5 hours, and heated in a nitrogen gas atmosphere at 300° C. for 5 hours to complete imidization. The coating film was peeled off the glass substrate to obtain a polyimide film. The thickness and tensile strength of the polyimide film and the glass transition temperature of the polyimide constituting the film are shown in Table 1.

EXAMPLE 34

In 10.00 g of N,N-dimethylformamide was dissolved 4.45 g of 4,4'-oxydiphthalic acid, and 5.55 g (1 equiv.) of bis[4-(4-aminophenoxy)phenyl]sulfone was added thereto, followed by stirring for 1 hour, to obtain a uniform clear pale brown solution. The solid concentration and viscosity of the resulting solution are shown in Table 1 below.

The resulting solution was cast on a glass substrate to a thickness of 25 μm by means of a film applicator, dried in a nitrogen gas atmosphere at 80° C. for 5 hours, and heated in a nitrogen gas atmosphere at 300° C. for 5 hours to complete imidization. The coating film was peeled off the glass substrate to obtain a polyimide film. The thickness and tensile strength of the polyimide film and the glass transition temperature of the polyimide constituting the film are shown in Table 1.

EXAMPLE 35

In 10.00 g of N,N-dimethylformamide was dissolved 4.33 g of 3,3',4,4'-biphenyltetracarboxylic acid, and 5.55 g (1 equiv.) of bis[4-(4-aminophenoxy)phynyl]sulfone was added thereto, followed by stirring for 1 hour, to obtain a uniform clear pale brown solution. The solid concentration and viscosity of the resulting solution are shown in Table 1 below.

The resulting solution was cast on a glass substrate to a thickness of 25 μm by means of a film applicator, dried in a nitrogen gas atmosphere at 80° C. for 5 hours, and heated in a nitrogen gas atmosphere at 300° C. for 5 hours to complete imidization. The coating film was peeled off the glass substrate to obtain a polyimide film. The thickness and tensile strength of the polyimide film and the glass transition temperature of the polyimide constituting the film are shown in Table 1.

EXAMPLE 36

In 10.00 g of N,N-dimethylformamide was dissolved 4.53 g of 3,3',4,4'-benzophenonetetracarboxylic acid, and 5.47 g (1 equiv.) of bis[4-(4-aminophenoxy)phenyl]sulfone was added thereto, followed by stirring for 1 hour, to obtain a uniform clear pale brown solution. The solid concentration and viscosity of the resulting solution are shown in Table 1 below.

The resulting solution was cast on a glass substrate to a thickness of 25 Mm by means of a film applicator, dried in a nitrogen gas atmosphere at 80° C. for 5 hours, and heated in a nitrogen gas atmosphere at 300° C. for 5 hours to complete imidization. The coating film was peeled off the glass substrate to obtain a polyimide film. The thickness and tensile strength of the polyimide film and the glass transition temperature of the polyimide constituting the film are shown in Table 1.

EXAMPLE 37

In 10.00 g of N,N-dimethylformamide was dissolved 4.77 g of 3,3',4,4'-diphenylsulfonetetracarboxylic acid, and 5.23 g (1 equiv.) of bis[4-(4-aminophenoxy)phenyl]sulfone was added thereto, followed by stirring for 1 hour, to obtain a uniform clear pale brown solution. The solid concentration and viscosity of the resulting solution are shown in Table 1 below.

The resulting solution was cast on a glass substrate to a thickness of 25 μm by means of a film applicator, dried in a nitrogen gas atmosphere at 80° C. for 5 hours, and heated in a nitrogen gas atmosphere at 300° C. for 5 hours to complete imidization. The coating film was peeled off the glass substrate to obtain a polyimide film. The thickness and tensile strength of the polyimide film and the glass transition temperature of the polyimide constituting the film are shown in Table 1.

EXAMPLE 38

In 10 g of N,N-dimethylformamide was dissolved 5.01 g of 4,4'-oxydiphthalic acid, and 4.99 g (1 equiv.) of $\alpha,\alpha,$-bis(4-aminophenyl)-1,4-diisopropylbenzene was added thereto, followed by stirring for 1 hour, to obtain a uniform clear pale brown solution. The solid concentration and viscosity of the resulting solution are shown in Table 1 below.

The resulting solution was cast on a glass substrate to a thickness of 25 μm by means of a film applicator, dried in a nitrogen gas atmosphere at 80° C. for 5 hours, and heated in a nitrogen gas atmosphere at 300° C. for 5 hours to complete imidization. The coating film was peeled off the glass substrate to obtain a polyimide film. The thickness and tensile strength of the polyimide film and the glass transition temperature of the polyimide constituting the film are shown in Table 1.

EXAMPLE 39

In 10.00 g of N,N-dimethylformamide was dissolved 5.10 g of 3,3',4,4'-benzophenonetetracarboxylic acid, and 4.90 g (1 equiv.) of a,a'-bis(4-aminophenyl)-1,4-diisopropylbenzene was added thereto, followed by stirring for 1 hour, to obtain a uniform clear pale brown solution.

The solid concentration and viscosity of the resulting solution are shown in Table 1 below.

The resulting solution was cast on a glass substrate to a thickness of 25 μm by means of a film applicator, dried in a nitrogen gas atmosphere at 80° C. for 5 hours, and heated in a nitrogen gas atmosphere at 300° C. for 5 hours to complete imidization. The coating film was peeled off the glass substrate to obtain a polyimide film. The thickness and tensile strength of the polyimide film and the glass transition temperature of the polyimide constituting the film are shown in Table 1.

EXAMPLE 40

In 10 g of N,N-dimethylformamide was dissolved 5.34 g of 3,3',4,4'-diphenylsulfonetetracarboxylic acid, and 4.66 g (1 equiv.) of $\alpha,\alpha'$-bis(4-aminophenyl)-1,4-diisopropylbenzene was added thereto, followed by stirring for 1 hour, to obtain a uniform clear pale brown solution. The solid concentration and viscosity of the resulting solution are shown in Table 1 below.

The resulting solution was cast on a glass substrate to a thickness of 25 μm by means of a film applicator, dried in a nitrogen gas atmosphere at 80° C. for 5 hours, and heated in a nitrogen gas atmosphere at 300° C. for 5 hours to complete imidization. The coating film was peeled off the glass substrate to obtain a polyimide film. The thickness and tensile strength of the polyimide film and the glass transition temperature of the polyimide constituting the film are shown in Table 1.

EXAMPLE 41

In 10 g of N,N-dimethylformamide was dissolved 5.01 g of 4,4'-oxydiphthalic acid, and 5.42 g (1 equiv.) of 2,2-bis[4-(4-aminophenoxy)phenyl]propane was added thereto, followed by stirring for 1 hour, to obtain a uniform clear pale brown solution. The solid concentration and viscosity of the resulting solution are shown in Table 1 below.

The resulting solution was cast on a glass substrate to a thickness of 25 μm by means of a film applicator, dried in a nitrogen gas atmosphere at 80° C. for 5 hours, and heated in a nitrogen gas atmosphere at 300° C. for 5 hours to complete imidization. The coating film was peeled off the glass substrate to obtain a polyimide film. The thickness and tensile strength of the polyimide film and the glass transition temperature of the polyimide constituting the film are shown in Table 1.

EXAMPLE 42

In 10 g of N,N-dimethylformamide was dissolved 4.66 g of 3,3',4,4'-benzophenonetetracarboxylic acid, and 5.34 g (1 equiv.) of 2,2-bis[4-(4-aminophenoxy)phenyl]propane was added thereto, followed by stirring for 1 hour, to obtain a uniform clear pale brown solution. The solid concentration and viscosity of the resulting solution are shown in Table 1 below.

The resulting solution was cast on a glass substrate to a thickness of 25 μm by means of a film applicator, dried in a nitrogen gas atmosphere at 80° C. for 5 hours, and heated in a nitrogen gas atmosphere at 300° C. for 5 hours to complete imidization. The coating film was peeled off the glass substrate to obtain a polyimide film. The thickness and tensile strength of the polyimide film and the glass transition temperature of the polyimide constituting the film are shown in Table 1.

EXAMPLE 43

In 10 g of N,N-dimethylformamide was dissolved 4.90 of 3,3',4,4'-diphenylsulfonetetracarboxylic acid, and 5.10 g (1 equiv.) of 2,2-bis[4-(4-aminophenoxy)phenyl]propane was added thereto, followed by stirring for 1 hour, to obtain a uniform clear pale brown solution. The solid concentration and viscosity of the resulting solution are shown in Table 1 below.

The resulting solution was cast on a glass substrate to a thickness of 25 μm by means of a film applicator, dried in a nitrogen gas atmosphere at 80° C. for 5 hours, and heated in a nitrogen gas atmosphere at 300° C. for 5 hours to complete imidization. The coating film was peeled off the glass substrate to obtain a polyimide film. The thickness and tensile strength of the polyimide film and the glass transition temperature of the polyimide constituting the film are shown in Table 1.

EXAMPLE 44

In 10 g of N,N-dimethylformamide was dissolved 6.20 g of 4,4'-oxydiphthalic acid, and 3.8 g (1 equiv.) of 2,2'-dimethylbenzidine was added thereto, followed by stirring for 1 hour, to obtain a uniform clear pale brown solution. The solid concentration and viscosity of the resulting solution are shown in Table 1 below.

The resulting solution was cast on a glass substrate to a thickness of 25 μm by means of a film applicator, dried in a nitrogen gas atmosphere at 80° C. for 5 hours, and heated in a nitrogen gas atmosphere at 300° C. for 5 hours to complete imidization. The coating film was peeled off the glass substrate to obtain a polyimide film. The thickness and tensile strength of the polyimide film and the glass transition temperature of the polyimide constituting the film are shown in Table 1.

EXAMPLE 45

In 10 g of N,N-dimethylformamide was dissolved 6.28 of 3,3',4,4'-benzophenonetetracarboxylic acid, and 3.72 g (1 equiv.) of 2,2-dimethylbenzidine was added thereto, followed by stirring for 1 hour, to obtain a uniform clear pale brown solution. The solid concentration and viscosity of the resulting solution are shown in Table 1 below.

The resulting solution was cast on a glass substrate to a thickness of 25 μm by means of a film applicator, dried in a nitrogen gas atmosphere at 80° C. for 5 hours, and heated in a nitrogen gas atmosphere at 300° C. for 5 hours to complete imidization. The coating film was peeled off the glass substrate to obtain a polyimide film. The thickness and tensile strength of the polyimide film and the glass transition temperature of the polyimide constituting the film are shown in Table 1.

EXAMPLE 46

In 10 g of N,N-dimethylformamide was dissolved 6.50 g of 3,3',4,4'-diphenylsulfonetetracarboxylic acid, and 3.50 g (1 equiv.) of 2,2'-dimethylbenzidine was added thereto, followed by stirring for I hour, to obtain a uniform clear pale brown solution. The solid concentration and viscosity of the resulting solution are shown in Table 1 below.

The resulting solution was cast on a glass substrate to a thickness of 25 μm by means of a film applicator, dried in a nitrogen gas atmosphere at 80° C. for 5 hours, and heated in a nitrogen gas atmosphere at 300° C. for 5 hours to complete imidization. The coating film was peeled off the glass substrate to obtain a polyimide film. The thickness and tensile strength of the polyimide film and the glass transition temperature of the polyimide constituting the film are shown in Table 1.

EXAMPLE 47

In 35 g of a mixed solvent of tetrahydrofuran and methanol (8:2 by weight) was dispersed 19.27 g of dimethyl 3,3',4,4'-biphenyltetracarboxylate, and 15.73 g (I equiv.) of 1,3-bis(4-aminophenoxy)benzene was added thereto, followed by stirring for 5 hours to obtain a uniform clear pale brown solution. The solid concentration and viscosity of the solution are shown in Table 1.

The solution was applied on a glass plate with a spin coater, dried spontaneously at room temperature for 2 hours, heated from 50° C. to 100° C. over a period of 48 hours, and heated at 300° C. for 5 hours in a nitrogen gas atmosphere to complete imidization to obtain a polyimide-coated glass plate. The glass transition temperature of the polyimide constituting the coating film is shown in Table 1.

EXAMPLE 48

In 35 g of a mixed solvent of tetrahydrofuran and methanol (8:2 by weight) was dissolved 19.65 g of dimethyl 4,4'-oxydiphthalate, and 15.35 g (1 equiv.) of 1,3-bis(4-aminophenoxy)benzene was added thereto, followed by stirring for 1 hour to obtain a uniform clear pale brown solution. The solid concentration and viscosity of the solution are shown in Table 1.

The solution was applied on a glass plate with a spin coater, dried spontaneously at room temperature for 2 hours, heated from 50° C. to 100° C. over a period of 48 hours, and heated at 300° C. in a nitrogen gas atmosphere for 5 hours to cause imidization. A polyimide-coated glass plate was thus obtained. The glass transition temperature of the polyimide constituting the coating film is shown in Table 1.

EXAMPLE 49

In 50 g of N-methylpyrrolidone was dissolved 25.2 g of dimethyl 4,4'-oxydiphthalate, and 24.8 g (1 equiv.) of 4,4'- bis(4-aminophenoxy)biphenyl was added thereto, followed by stirring for 1 hour to obtain a clear brown solution. The solid concentration and viscosity of the solution are shown in Table 1.

The resulting solution was cast on a glass substrate to a thickness of 25 μm by means of a film applicator, dried in a nitrogen gas atmosphere at 80° C. for 5 hours, and heated in a nitrogen gas atmosphere at 300° C. for 5 hours to complete imidization. The coating film was peeled off the glass substrate to obtain a polyimide film. The thickness and tensile strength of the polyimide film and the glass transition temperature of the polyimide constituting the film are shown in Table 1.

EXAMPLE 50

In 50 g of N-methylpyrrolidone was dissolved 25.59 g of 3,3',4,4'-benzophenonetetracarboxylic acid, and 24.41 h (1 equiv.) of 4,4'-bis(4-aminophenoxy)biphenyl was added thereto, followed by stirring for 1 hour to obtain a clear brown solution. The solid concentration and viscosity of the solution are shown in Table 1.

The resulting solution was cast on a glass substrate to a thickness of 25 μm by means of a film applicator, dried in a nitrogen gas atmosphere at 80° C. for 5 hours, and heated in a nitrogen gas atmosphere at 300° C. for 5 hours to complete imidization. The coating film was peeled off the glass substrate to obtain a polyimide film. The thickness and tensile strength of the polyimide film and the glass transition temperature of the polyimide constituting the film are shown in Table 1.

COMPARATIVE EXAMPLE 1

In 12 g of a mixed solvent of tetrahydrofuran and methanol (8:2 by weight) was dissolved 4.70 g of 3,4'-oxydianiline, and 7.70 g of 4,4'-oxydiphthalic acid dianhydride was added thereto, followed by stirring. The viscosity increased due to polymerization of the 3,4'-oxydianiline and 4,4'-oxydiphthalic dianhydride in the solvent. When the solid concentration reached 50 wt %, stirring was impossible because of the increased viscosity.

COMPARATIVE EXAMPLE 2

In 50 g of N-methylpyrrolidone was dissolved 4.70 g of 3,4'-oxydianiline, and 7.70 g of 4,4'-oxydiphthalic dianhydride was added thereto, followed by stirring to obtain a clear solution. The solid concentration and viscosity of the solution are shown in Table 1.

By a similar method as in Example 50, a polyimide film was prepared from this solution. However, the desired film thickness could not be obtained because of the low solid concentration. The thickness and tensile strength of the polyimide film and the glass transition temperature of the polyimide constituting the film are shown in Table 1.

TABLE 1

| | Solution | | Form | Film | | |
|---|---|---|---|---|---|---|
| Example No. | Solid Concn. (wt %) | Viscosity (poise) | of Product* | Thickness (μm) | Tensile Strength (kg/mm²) | Tg (° C.) |
| 1 | 50 | 2.3 | F | 17 | 13.1 | 242 |
| 2 | 50 | 2.6 | F | 16 | 13.0 | 245 |
| 3 | 50 | 51.5 | F | 16 | 13.0 | 245 |
| 4 | 40 | 35.5 | C | — | — | 239 |
| 5 | 70 | 20 | C | — | — | 240 |
| 6 | 90 | — | C | — | — | 239 |
| 7 | 50 | 0.3 | C | — | — | 239 |
| 8 | 50 | 0.8 | F | 17 | 13.7 | 240 |
| 9 | 50 | 2.8 | F | 17 | 13.1 | 241 |
| 10 | 50 | 3.2 | F | 17 | 12.8 | 237 |
| 11 | 50 | 0.4 | C | — | — | 244 |
| 12 | 50 | 1.6 | F | 8 | 13.0 | 251 |
| 13 | 40 | 20 | F | 8 | 12.5 | 255 |
| 14 | 50 | 0.4 | C | — | — | 143 |
| 15 | 60 | 19.9 | F | 17 | 12.5 | 260 |
| 16 | 40 | 0.2 | F | 12 | 10.5 | 249 |
| 17 | 40 | 0.4 | F | 20 | 13.5 | 215 |
| 18 | 18 | 3.0 | F | 8 | 13.0 | 270 |
| 19 | 50 | 0.96 | F | 8 | 11.0 | 305 |
| 20 | 40 | 0.4 | F | 3 | 13.5 | 310 |
| 21 | 50 | 10 | F | 13 | 12.8 | 280 |
| 22 | 50 | 15 | C | — | — | 290 |
| 23 | 60 | 6.6 | C | — | — | 287 |
| 24 | 60 | 0.7 | C | — | — | 310 |
| 25 | 50 | 2.4 | F | 13 | 12.4 | 205 |
| 26 | 50 | 2.2 | F | 12 | 13.4 | 240 |
| 27 | 30 | 0.75 | F | 15 | 10.7 | 265 |
| 28 | 50 | 2.8 | F | 12 | 11.0 | 254 |
| 29 | 50 | 1.6 | F | 13 | 10.2 | 301 |
| 30 | 50 | 3.0 | F | 13 | 9.5 | 280 |
| 31 | 50 | 1.5 | F | 11 | 11.7 | 200 |
| 32 | 50 | 1.3 | F | 12 | 13.4 | 230 |
| 33 | 50 | 1.6 | F | 11 | 12.5 | 235 |
| 34 | 50 | 2.0 | F | 11 | 11.1 | 268 |
| 35 | 50 | 1.5 | F | 11 | 9.1 | 276 |
| 36 | 50 | 2.2 | F | 11 | 12.4 | 269 |
| 37 | 50 | 2.3 | F | 12 | 11.4 | 290 |
| 38 | 50 | 2.4 | F | 12 | 9.6 | 250 |
| 39 | 50 | 2.6 | F | 12 | 12.2 | 253 |
| 40 | 50 | 2.6 | F | 11 | 10.6 | 267 |
| 41 | 50 | 1.7 | F | 10 | 10.6 | 220 |
| 42 | 50 | 2.2 | F | 11 | 10.6 | 236 |
| 43 | 50 | 2.2 | F | 12 | 10.69 | 243 |
| 44 | 50 | 4.8 | F | 10 | 15.1 | 315 |
| 45 | 50 | 5.0 | F | 11 | 14.2 | 312 |
| 46 | 50 | 5.7 | F | 12 | 12.8 | 319 |
| 47 | 50 | 10.5 | C | — | — | 246 |
| 48 | 50 | 2.9 | C | — | — | 228 |
| 49 | 50 | 2.5 | F | 11 | 11.5 | 220 |
| 50 | 50 | 2.8 | F | 12 | 12.2 | 241 |
| Compara. Ex. 1 | 50 | — | — | — | — | — |
| Compara. Ex. 2 | 20 | 35 | F | 5 | 12.5 | 242 |

Note:
*"F" and "C" stand for "film" and "coat", respectively.

As shown above, the polyimide precursor solution according to the present invention provides a high concentration polyimide precursor having a low viscosity. Accordingly, the polyimide precursor solution is easy to handle and a polyimide-coated product and a polyimide film having high tensile strength can be easily prepared.

While the invention has been described in detail and with reference to specific embodiments thereof, it will be apparent to one skilled in the art that various changes and modifications can be made therein without departing from the spirit and scope thereof.

What is claimed is:

1. A polyimide precursor solution which forms polyimide on imidization, comprising a solvent and a solute dissolved in the solvent, said solute comprising, in a concentration of 50% by weight or more of the solution, a salt comprising an aromatic diamine and an aromatic tetracarboxylic acid and/or an aromatic dicarboxylic acid-dialkyl ester, wherein said solution has a viscosity of 20 poise or less, wherein said aromatic diamine is selected from the group consisting of

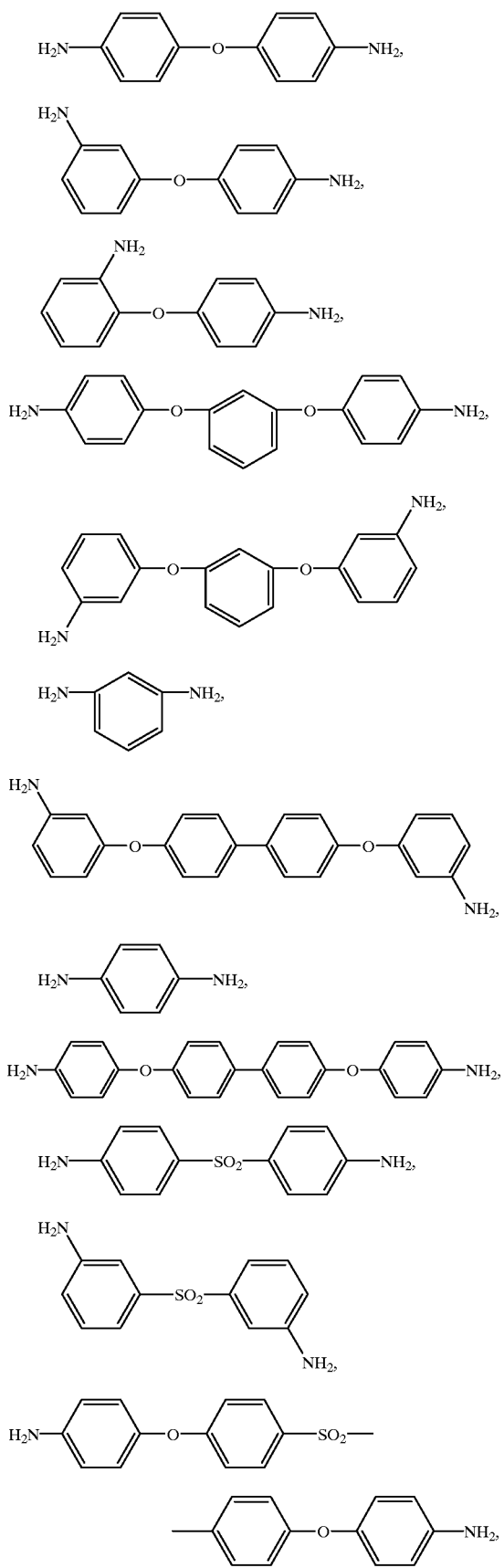

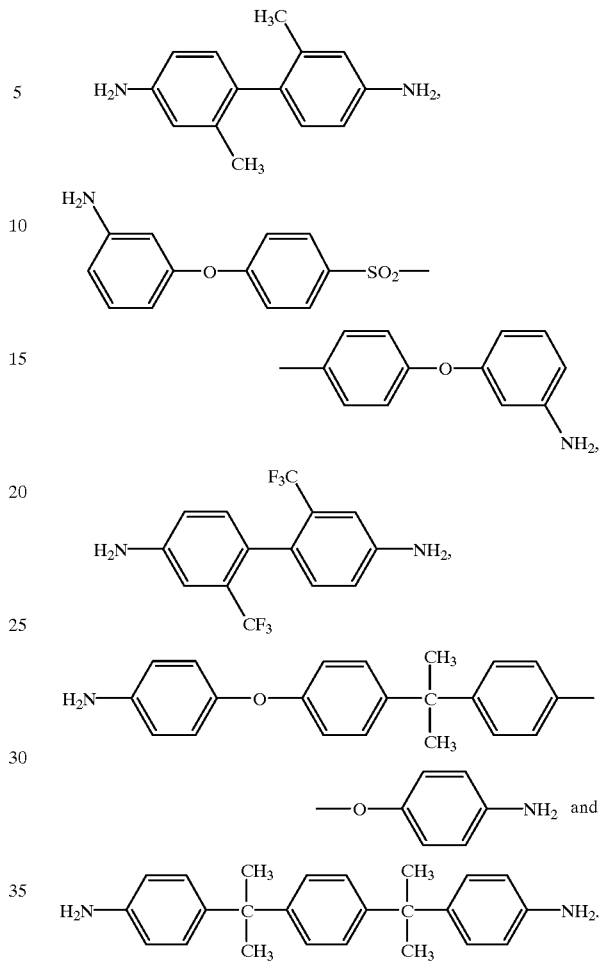

2. The polyimide precursor solution according to claim 1, wherein said tetracarboxylic acid and/or aromatic dicarboxylic acid-dialkyl ester is represented by formula (II):

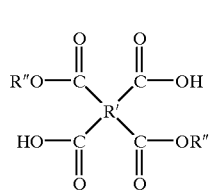

(II)

wherein R' represents a tetravalent aromatic residual group containing at least one 6-membered carbon ring and not containing a heterocyclic ring; the four carboxyl groups are bonded to different carbon atoms on the residual group R', making two pairs each one of which is bonded to adjacent carbon atoms on the residual group R'; and R" represents a hydrogen atom or an alkyl group having 1 to 5 carbon atoms.

3. The polyimide precursor solution according to claim 1, wherein said aromatic tetracarboxylic acid and/or aromatic dicarboxylic acid-dialkyl ester is selected from the group consisting of

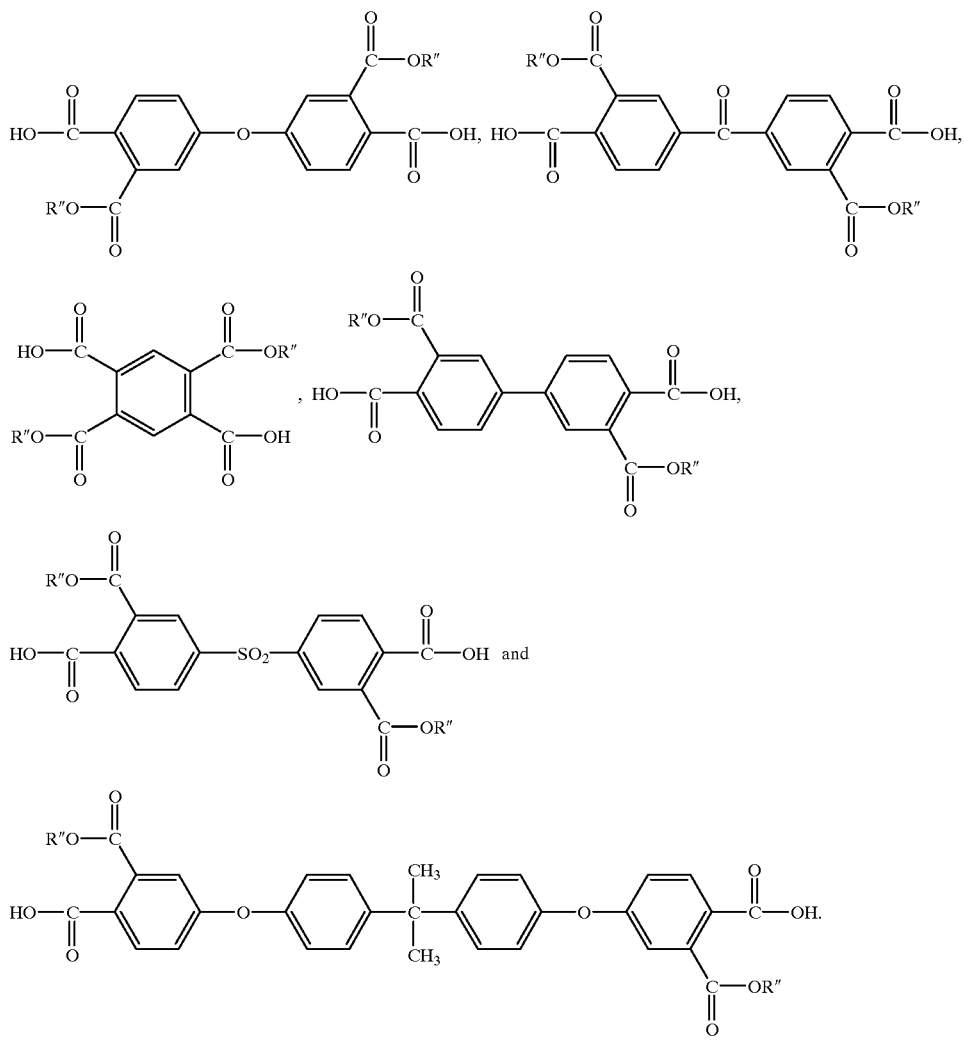

wherein R" is a hydrogen atom or an alkyl group having 1 to 5 carbon atoms.

4. The polyimide precursor solution according to claim 1, wherein said aromatic diamine is

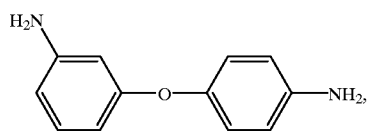

and said aromatic tetracarboxylic acid and/or aromatic dicarboxylic acid-dialkyl ester is

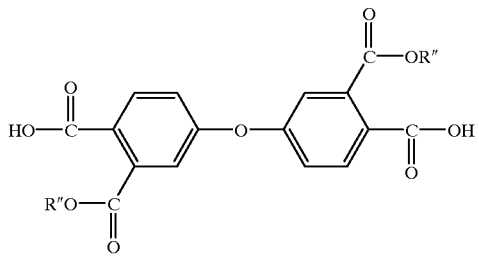

wherein R" is a hydrogen atom or an alkyl group having 1 to 5 carbon atoms.

5. The polyimide precursor solution according to claim 1, wherein said aromatic diamine is

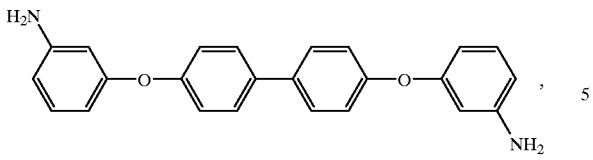

and said aromatic tetracarboxylic acid and/or aromatic dicarboxylic acid-dialkyl ester is

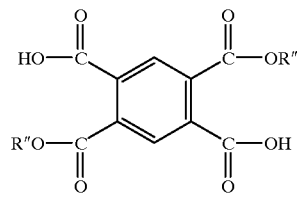

wherein R" is a hydrogen atom or an alkyl group having 1 to 5 carbon atoms.

6. The polyimide precursor solution according to claim 1, wherein said aromatic diamine is

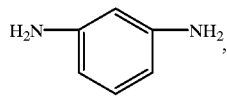

and said aromatic tetracarboxylic acid and/or aromatic dicarboxylic acid-dialkyl ester is

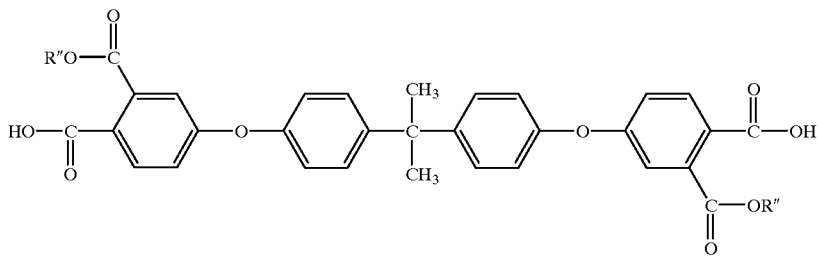

wherein R" is a hydrogen atom or an alkyl group having 1 to 5 carbon atoms.

7. The polyimide precursor solution according to claim 1, wherein said aromatic diamine is

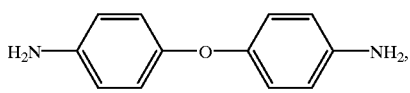

and said aromatic tetracarboxylic acid and/or aromatic dicarboxylic acid-dialkyl ester is

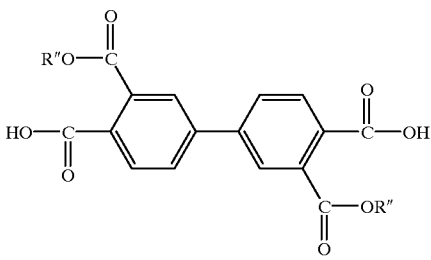

wherein R" is a hydrogen atom or an alkyl group having 1 to 5 carbon atoms.

8. The polyimide precursor solution according to claim 1, wherein said aromatic diamine is

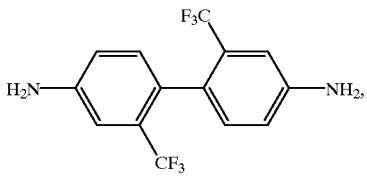

and said aromatic tetracarboxylic acid and/or aromatic dicarboxylic acid-dialkyl ester is

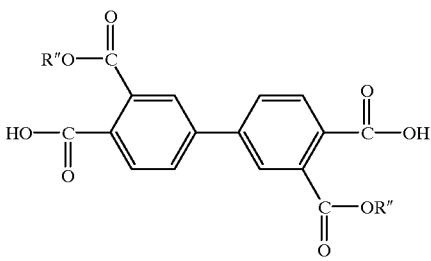

wherein R" is a hydrogen atom or an alkyl group having 1 to 5 carbon atoms.

9. The polyimide precursor solution according to claim 1, wherein said aromatic diamine is

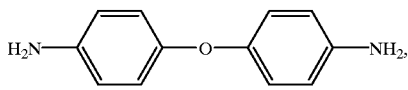

and said aromatic tetracarboxylic acid and/or aromatic dicarboxylic acid-dialkyl ester is

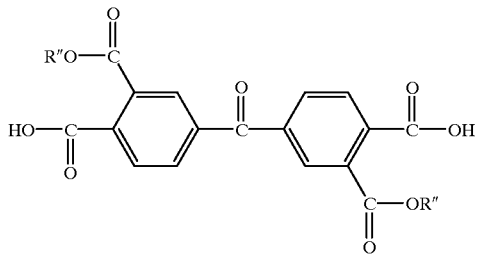

wherein R" is a hydrogen atom or an alkyl group having 1 to 5 carbon atoms.

10. The polyimide precursor solution according to claim 1, wherein said aromatic diamine is

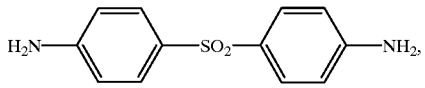

and said aromatic tetracarboxylic acid and/or aromatic dicarboxylic acid-dialkyl ester is

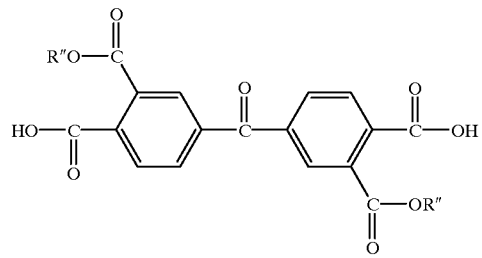

wherein R" is a hydrogen atom or an alkyl group having 1 to 5 carbon atoms.

11. The polyimide precursor solution according to claim 1, wherein said solvent is selected from the group consisting of diethylene glycol monomethyl ether, N,N-dimethylformamide, N,N-dimethylacetamide and N-methylpyrrolidone.

12. The polyimide precursor solution according to claim 1, wherein said solvent is selected from the group consisting of a water-soluble alcohol, tetrahydrofuran and dimethoxyethane.

13. The polyimide precursor solution according to claim 1, wherein said solvent comprises a tertiary amine compound or a mixture containing a tertiary amine compound.

14. A polyimide coating film prepared from the polyimide precursor solution according to claim 1.

15. A process for producing a polyimide coating film which comprises applying the polyimide precursor solution according to claim 1 to a substrate, and heating the resulting coating film to cause imidization.

* * * * *

UNITED STATES PATENT AND TRADEMARK OFFICE
CERTIFICATE OF CORRECTION

PATENT NO. : 6,133,407
DATED : Oct. 17, 2000
INVENTOR(S) : Hisayasu Kaneshiro, et al It is certified that error appears in the above-identified patent and that said Letters Patent is hereby corrected as shown below:

In item [73] of the face page of the patent, under "Assignee:", change "Unitka Ltd.," to --Unitika Ltd.--.

Signed and Sealed this

Eighth Day of May, 2001

Attest:

NICHOLAS P. GODICI

*Attesting Officer*  *Acting Director of the United States Patent and Trademark Office*